United States Patent
Goyal et al.

(12)

(10) Patent No.: US 6,751,473 B1
(45) Date of Patent: Jun. 15, 2004

(54) WIRELESS COMMUNICATION TERMINAL HAVING A VIDEO IMAGE CAPABILITY

(75) Inventors: Suresh Goyal, Warren, NJ (US); Rajarshi Ray, Princeton, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/258,824

(22) Filed: Feb. 26, 1999

Related U.S. Application Data

(63) Continuation-in-part of application No. 08/649,554, filed on May 17, 1996, now Pat. No. 5,960,386.

(51) Int. Cl.[7] .................................................. H04B 1/38

(52) U.S. Cl. .............................. 455/556.1; 455/575.1; 455/90.3; 455/566

(58) Field of Search ........................ 455/556.1, 575.1, 455/422.1, 517, 550.1, 557, 566, 90.3; 370/335, 342, 344, 320; 348/14, 20, 158, 151, 294, 333, 376, 373; 340/707; 379/433, 58, 434, 93, 90, 96–99, 110, 61, 63; 33/189; 345/156, 168, 169; 381/183, 187, 25, 81, 68, 69

(56) References Cited

U.S. PATENT DOCUMENTS

| | | | | |
|---|---|---|---|---|
| 3,820,148 A | * | 6/1974 | Osanai | 354/295 |
| 3,881,675 A | * | 5/1975 | Matchett | 248/170 |
| 4,262,426 A | * | 4/1981 | Miyazaki | 33/189 |
| 5,200,913 A | * | 4/1993 | Hawkins et al. | 361/681 |
| 5,414,444 A | * | 5/1995 | Britz | 345/156 |
| 5,491,507 A | * | 2/1996 | Umezawa et al. | 348/14 |
| 5,506,911 A | * | 4/1996 | Neuman et al. | 381/183 |
| 5,541,609 A | * | 7/1996 | Stutzman et al. | 343/702 |
| 5,550,754 A | * | 8/1996 | McNelley et al. | 364/514 |
| 5,586,183 A | * | 12/1996 | Marcus et al. | 379/433 |
| 5,719,936 A | * | 2/1998 | Hillenmayer | 379/447 |

\* cited by examiner

Primary Examiner—Edward F. Urban
Assistant Examiner—C. Chow

(57) ABSTRACT

A portable wireless communication terminal includes electronics for receiving and transmitting both video and audio signals. The electronics are housed in rugged, drop-tolerant consoles, which are interconnected so that they may be extended and reconfigured relative to each other for convenient use and easy, compact storage. A camera lens is included in a camera console, a video display is included in a video display console, and alphanumerical keys are included in a base console. The camera console can be rotated relative to the video display console so that the user can transmit a video signal of the surroundings while watching the video display. Further, the video display console can be extended and tilted relative to the base console.

31 Claims, 16 Drawing Sheets

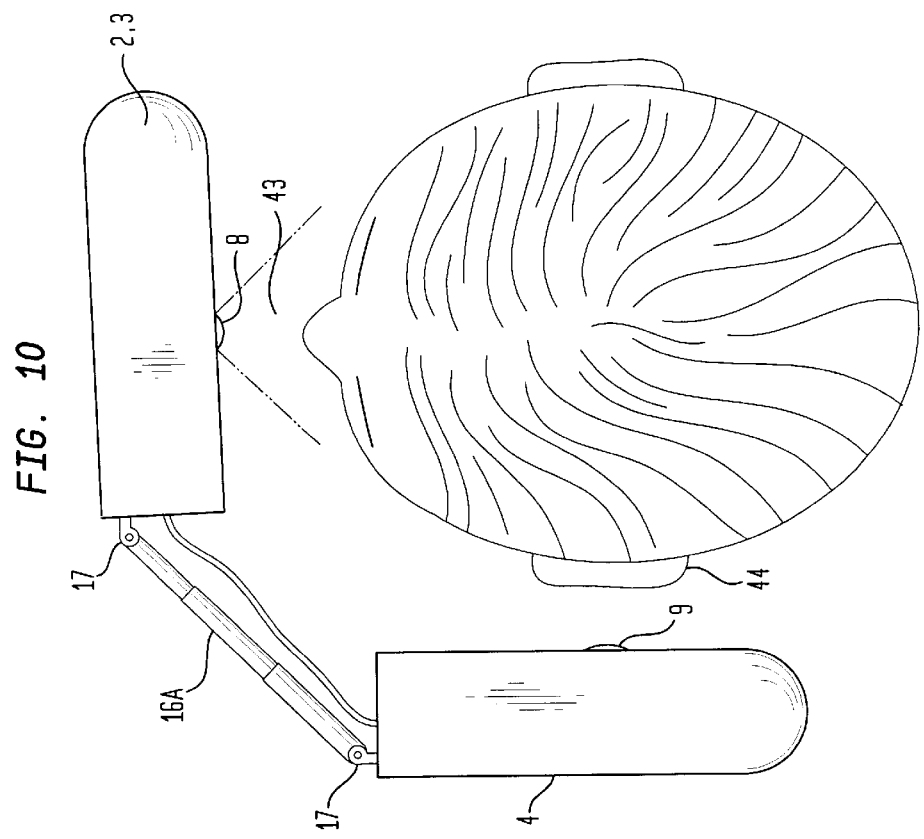
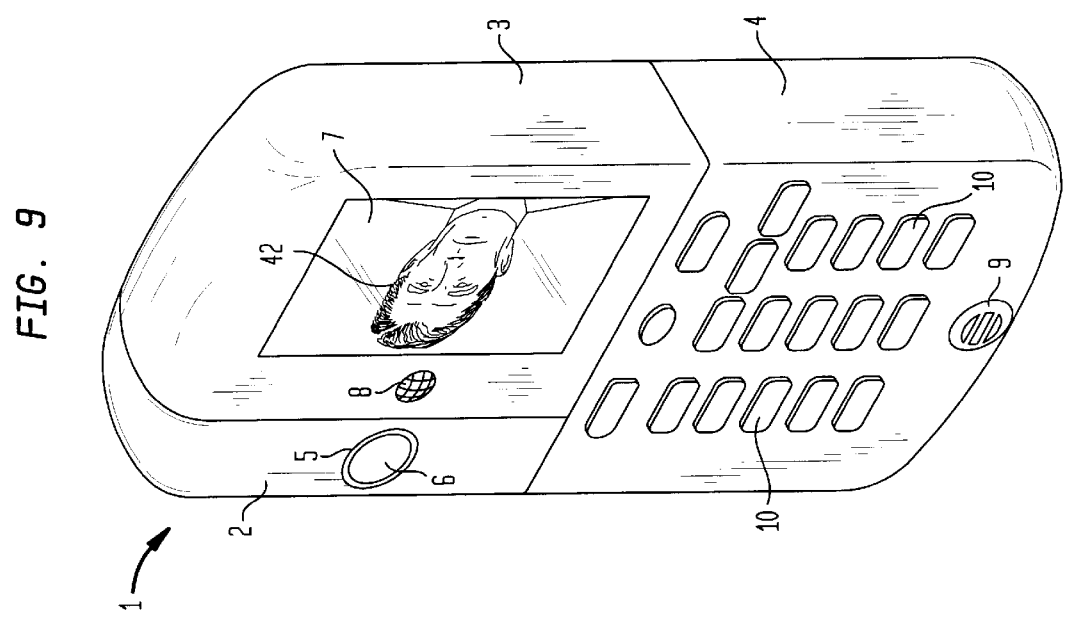

WIRELESS COMMUNICATION TERMINAL HAVING A VIDEO IMAGE CAPABILITY

CROSS-REFERENCE TO RELATED APPLICATIONS

This application is a continuation-in-part of U.S. Pat. No. 6,192,257, entitled "A Wireless Terminal Having Video Image Capability".

BACKGROUND OF THE INVENTION

1. Field of the Invention

The present invention relates to a portable wireless communication terminal having the capability to receive and transmit both video and audio signals. The communication terminal is housed in a small portable handheld unit, which includes a small video camera, a video display, and other conventional mobile telephone features. The handheld unit has extendable and configurable consoles so that the camera and video display can be selectively arranged to best convenience the user. Further, the handheld unit is lightweight, compact, easy to store, drop-tolerant, and rugged.

2. Description of Related Art

Cellular phones have become an indispensable form of communication in today's society. Many businesses rely upon this wireless technology to keep in constant communication with employees outside the office. Also, cellular phones are a great convenience to our personal lives. To this end, there exists an ever-growing need to improve both the services offered by, and features of, a cellular phone.

By the Applicants' prior U.S. application, Ser. No. 08/649,554, there is disclosed a portable, wireless communication terminal having advanced features relating to video signal processing. Particularly, the communication terminal has a video camera and video display. The communication terminal's features enable a user to send and receive video images while simultaneously receiving and sending audio signals.

SUMMARY OF THE INVENTION

The present invention relates to a housing for the portable wireless communication terminal disclosed in Applicants' U.S. Pat. No. 6,192,257.

It is an object of the present invention to provide a communication terminal wherein the electronics of the communication terminal are housed in consoles, which are interconnected so that they may be extended, rotated, and/or reconfigured relative to each other at the convenience of a user.

Another object of the present invention is to provide a communication terminal having a camera console which can be rotated relative to a video display console so that the user can transmit a video signal of his surroundings while watching the video display.

Yet another object of the present invention is to provide a communication terminal having a video display console which can be extended and tilted relative to a base console. This adjustment feature allows the user to hold the communication terminal adjacent to his head during use. Alternatively, the user can place the communication terminal on a surface for convenient hands-free operation.

These and other objects of the present invention are fulfilled by providing a portable wireless communication terminal comprising: a camera console; a camera mounted in said camera console; a video display console; a video display mounted in said video display console; and a base console, wherein said camera console, video display console, and base console are interconnected and said camera console is movable relative to said video display console.

Moreover, these and other objects of the present invention are fulfilled by providing a portable wireless communication terminal comprising: a camera console; a camera mounted in said camera console; a video display console; a video display mounted in said video console; and a base console, wherein said camera console, video display console, and base console are interconnected and said video display console is movable relative to said base console.

Furthermore, these and other objects are fulfilled by a providing a portable wireless communication terminal comprising: a camera console; a camera mounted in said camera console; a video display console; a video display mounted in said video console; and a base console, wherein said camera console, video display console, and base console are interconnected, said camera console is movable relative to said video display console, and said video display console is movable relative to said base console.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 9 is a front view of a first alternative embodiment of the communication terminal, wherein the arrangement of the consoles has been modified;

FIG. 10 is an overhead view of the first alternative embodiment during use;

DETAILED DESCRIPTION OF THE PREFERRED EMBODIMENTS

Figure 1:
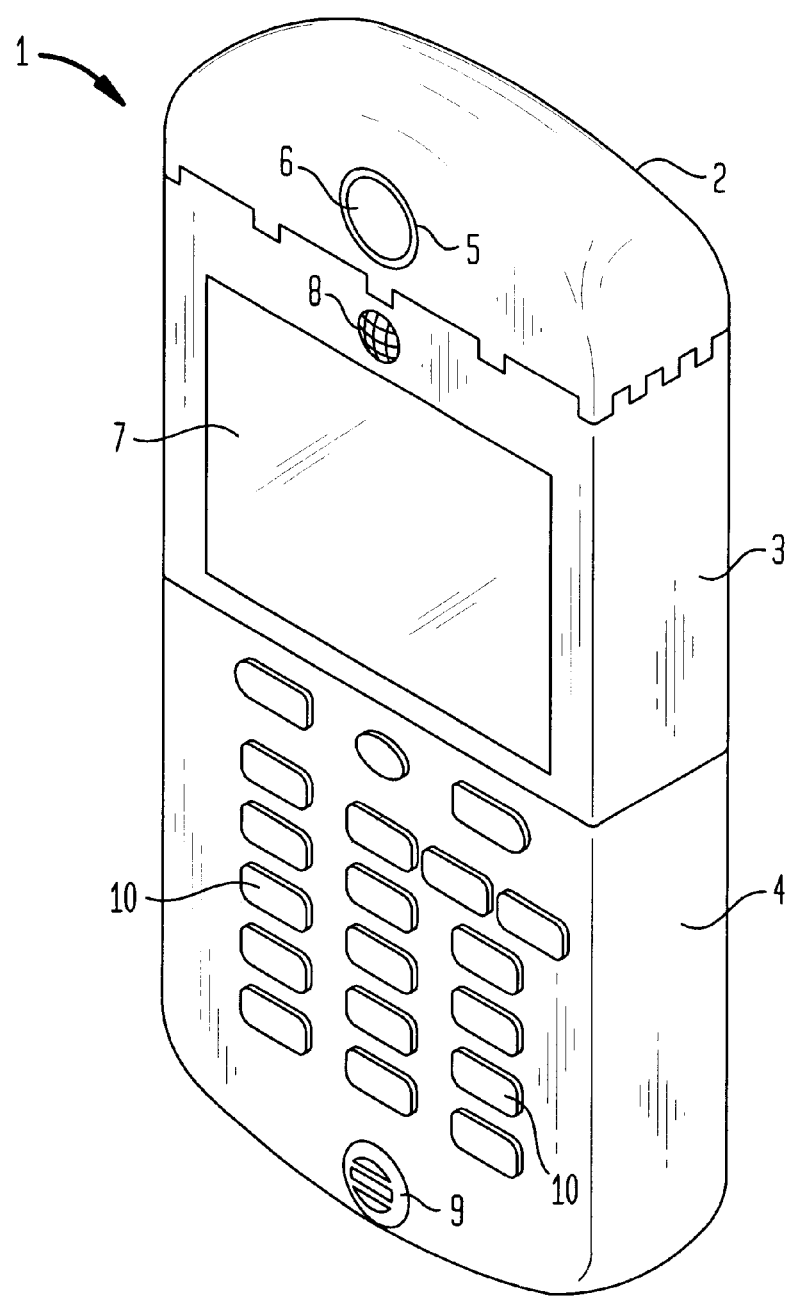
FIG. 1 is a front perspective view illustrating a portable, wireless, communication terminal, in accordance with the present invention.
Figure 2:
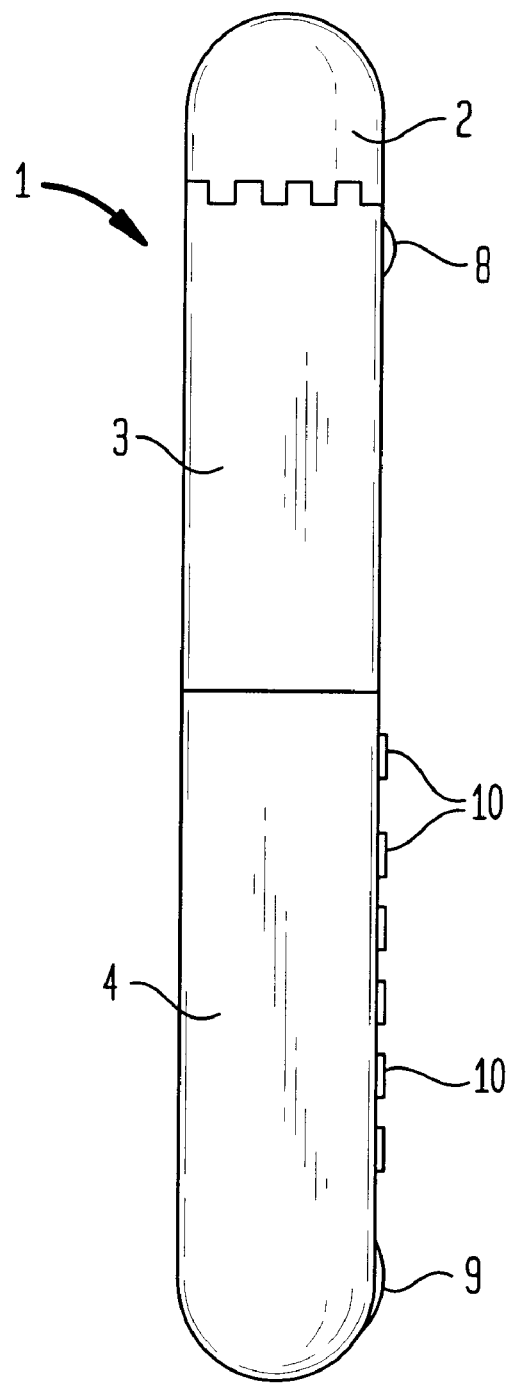
FIG. 2 is a side view of the communication terminal of FIG. 1 illustrating a camera console, a video display console and a base console.

Referring in detail to the drawings and with particular reference to FIGS. 1 and 2, a portable, wireless, communication terminal 1, in accordance with the present invention, includes a camera console 2, a video display console 3, and a base console 4.

The camera console 2 includes a camera lens opening 5 through which a camera lens 6 protrudes. The video display console 3 includes a microphone 8 and a video display 7, such as a color liquid crystal display. The base console 4 includes a speaker 9 and a plurality of conventional push button keys 10, such as numerical, functional, and power keys.

Of course, it is envisioned that the placements of the various components 5, 6, 7, 8, 9 and 10 could be altered. For example, the microphone 8 could be located below the video display 7, or the locations of the microphone 8 and the speaker 9 could be interchanged.

Figure 3:
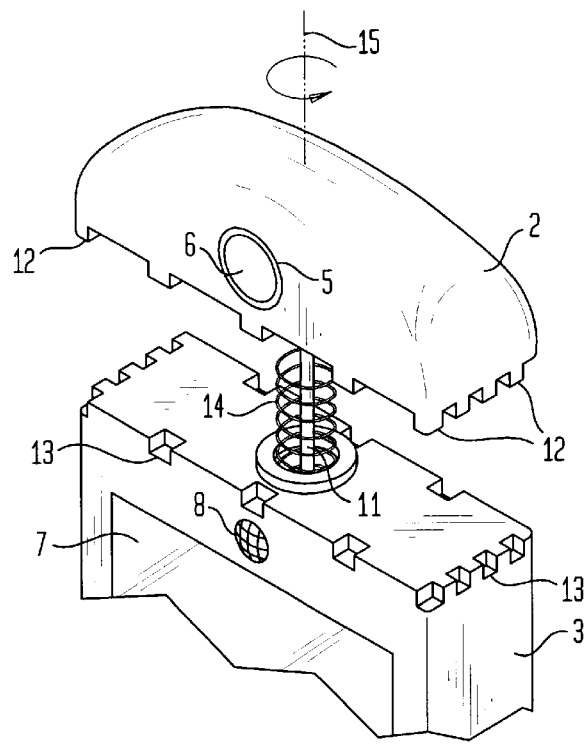
FIG. 3 is a close-up perspective view illustrating a guide connecting the camera console and the video display console.
Figure 4:
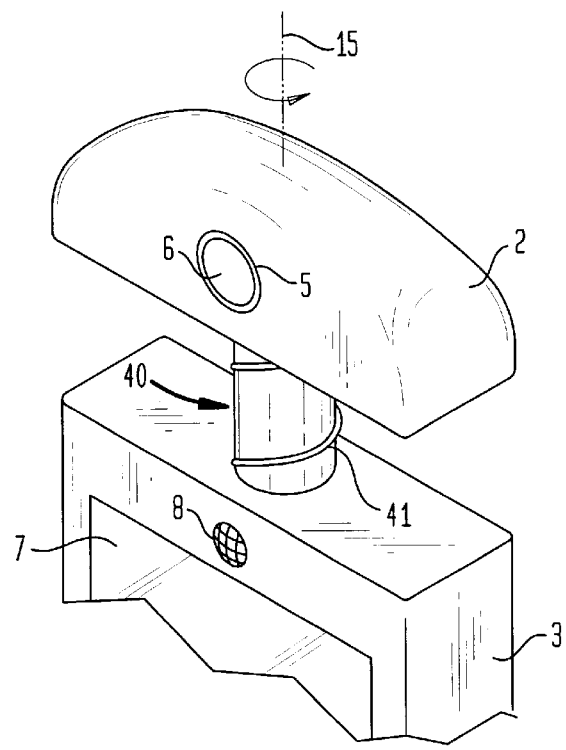
FIG. 4 is a close-up perspective view illustrating a threaded member connecting the camera console and the video display console.

Now, the physical interconnection between the camera console 2 and the video display console 3 will be described with reference to FIGS. 1–4. The camera console 2 is connected to the video display console 3 and moveable relative thereto. FIGS. 1 and 2 illustrate the camera console 2 in a first position, adjacent to and abutting the video display console 3. FIGS. 3 and 4 illustrate the camera console 2 in a second position, remote from the video display console 3.

As illustrated in FIG. 3, in a first embodiment, the camera console 2 is connected to the video display console 3 primarily by a guide rod 11. One end of the guide rod 11 is fixedly engaged to the video display console 3. The other end of the guide rod 11 is slidingly engaged within a guide rod track formed within the camera console 2. The other end would have a protrusion, or enlarged portion, so that the other end would be captured within the guide rod track. This captured of sliding engagement would allow the camera console 2 to be moved between the first and second positions, but would not allow the camera console 2 to be removed from the video display console 3.

It should be noted that connections of the guide rod 11 could be reversed. In the reverse arrangement, the guide rod track would exist within the video display console 3 and the other end would be fixedly engaged to the camera console 2. Also, it would be possible to modify the form of the guide rod track so that the guide rod 11, and thereby the camera console 2, could be removed from the guide rod track within the video display console 3 under predetermined circumstances, such as to perform service work.

A spring 14 encircles the guide rod 11 and is in tension, tending to urge the camera console 2 to the first position, adjacent to the video display console 3. Therefore, the second position of the camera console 2, illustrated in FIG. 3, is a temporary position. The temporary position occurs when the user manually pulls the camera console 2 up to its second position, against the biasing force of the spring 14.

In the second position, the user can rotate the camera console 2 one hundred and eighty degrees, either clockwise or counter-clockwise, about an axis 15 centered about the guide rod 11. When the camera console 2 is released, it will again assume the first position again. Rotation of the camera console 2 allows the camera lens 6 to selectively view any portion of the entire three hundred and sixty degrees of surrounding environment.

A lower surface of the camera console 2, facing the video display console 3, includes a plurality of spaced projections 12. An upper surface of the video display console 3, facing the camera console 2, includes a plurality of recesses 13. The protrusions 12 are sized and spaced to matingly engage within the recesses 13. The dimensions of each protrusion 12 are slightly smaller than the dimensions of its mating recess 13.

The protrusions 12 and recesses 13 act as alignment guides to seat the camera console 2 into one of two positions relative to the video display console 3, i.e. facing the user or facing one hundred and eighty degrees away from the user. The protrusions 12 and recesses 13 add to the rigidity of the connection between the camera console 2 and the video display console 3, thereby making the communication terminal 1 more drop-tolerant. Further, it should be noted that the projections 12 and recesses 13 may be so located that the camera console 2 can be seated at other angles besides zero and one hundred and eighty degrees.

It is also envisioned that a pivoted lever could be provided within the video display console 3 to move the camera console 2 into its second position. The pivoted lever would have an approximate L-shape. One end of the lever would project through a hole in the upper surface of the video display console 3 and contact the underside of the camera console 2. The other end of the lever would be a button projecting through a side surface of the video display console 3. By pressing the button the lever would pivot causing the other end of the lever to contact and press up against the underside of the camera console 2 causing the camera console to assume the second position against the bias of spring 14.

Moreover, it is within the purview of the present invention that the camera console 2 could be rotated relative to the video display console 3 without moving the camera console 2 to the second position. The movement of the camera console 2 to the second position merely facilitates the projection 12 and recess 13 alignment features. Other forms of alignment, such as a frictional force or click-in-place feature, could serve to indicate the extent of angular rotation of the camera console 2, without requiring that the camera console 2 assume the second position prior to rotation.

FIG. 4 illustrates an alternative embodiment of the connection between the camera console 2 and the video display console 3. In this embodiment, the camera console 2 is fixed to one end of a threaded screw 40. The threaded screw 40 is rotatably captured within the video display console 3. By turning the camera console 2, the user can select the view of the camera lens 6.

The threaded screw 40 permits the turning motion of the camera console 2 to be smooth and firm, and allows the connection between the camera console 2 and the video display console 3 to be quite rugged and drop-tolerant. Of course, the threads 41 formed on the threaded screw 40 may protrude or be recessed. Further, the threaded screw 40 could be fixed to the video display console 3 and rotatably captured within the camera console 2.

Electrical connections would exist between the camera console 2 and the video display console 3. These electrical connections could be a flexible ribbon cable extending between the two consoles 2, 3, similar to the ribbon cable 18 illustrated in FIGS. 5 and 7. Alternatively, the guide rod 11 or threaded screw 40 could be hollow, and the electrical connections could pass through the hollow spaces. A flexible bellows could encircle and protect the guide rod 11, spring 14, threaded screw 40, and/or electrical connections from moisture and other contaminants while the camera console 2 is in the second position.

One particular advantage of the rotatable camera console 2 is that the user can select the view to be seen by the person to whom he is speaking. Typically, the person to whom he is speaking would view the user. In this instance, the camera console 2 would be arranged as illustrated in FIGS. 1–4. However, in certain circumstances, it would be beneficial for the person to whom the user is speaking to view what the user is looking at, for example, when a field reporter describes an on-scene event, or when an salesman calls to describe a product for sale. In these instances, it is beneficial to direct the camera lens 6 toward the event or product, while still allowing the user to see the video display 7.

Figure 5:
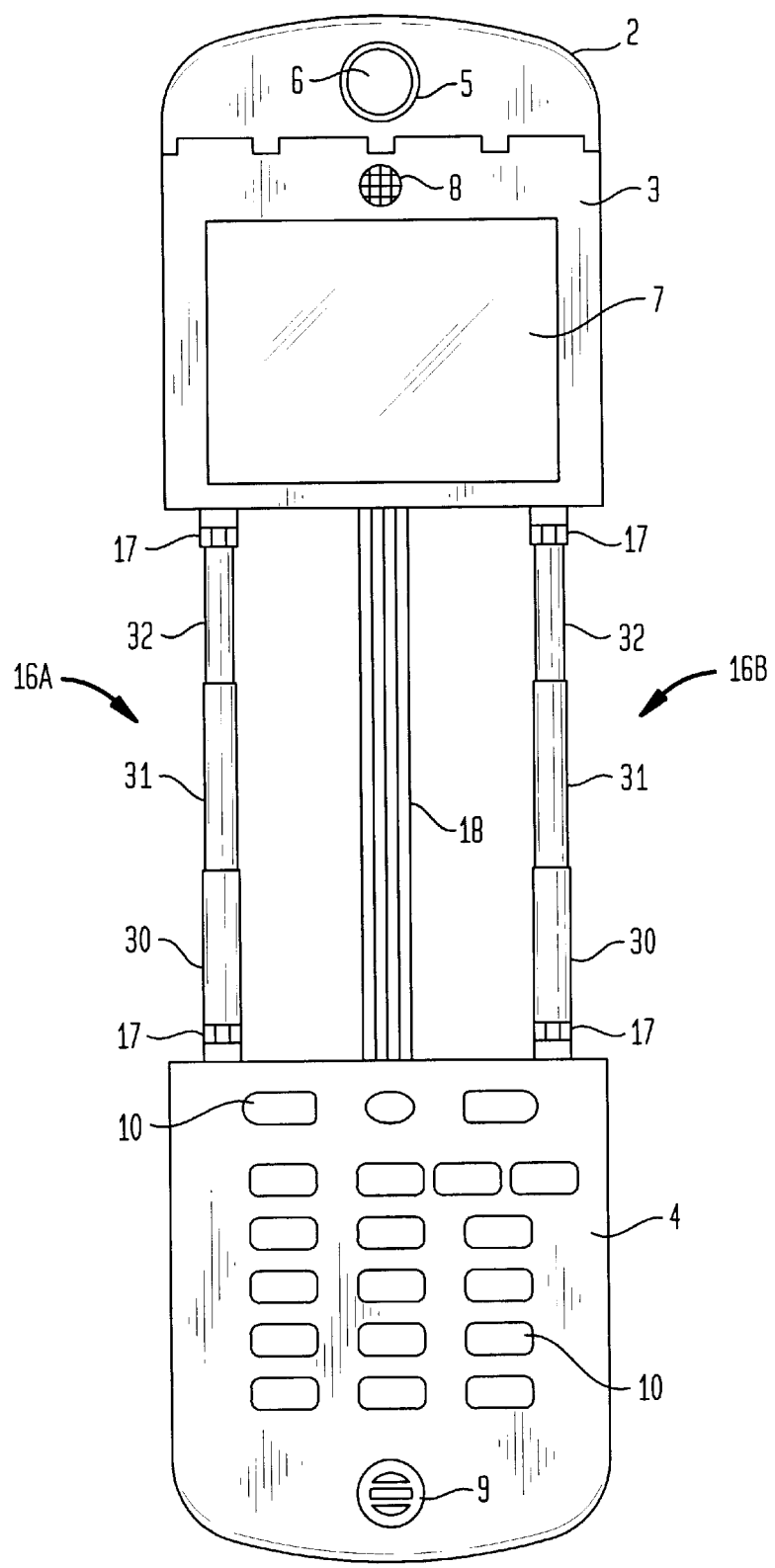
FIG. 5 is a front view illustrating the video display console in a remote position relative to the base console.
Figure 6:
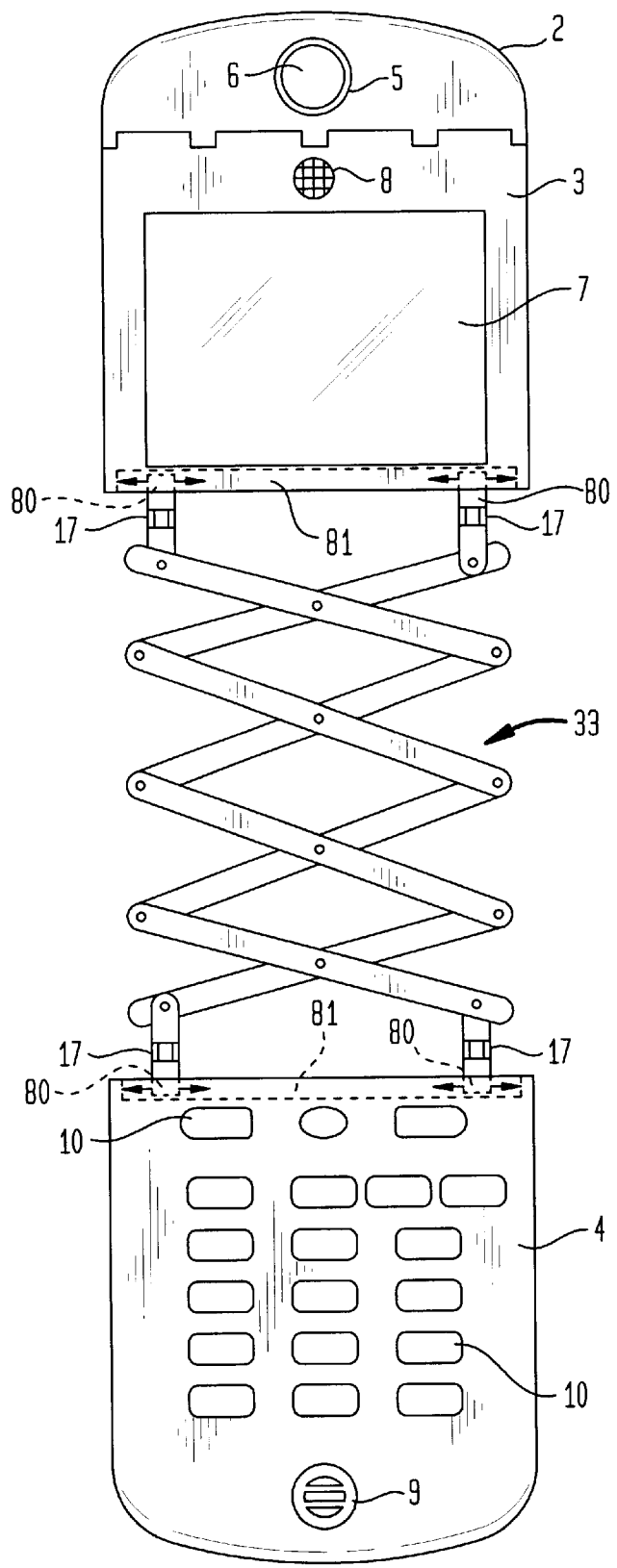
FIG. 6 is a front view illustrating a scissors linkage between the video display console and the base console.
Figure 7:
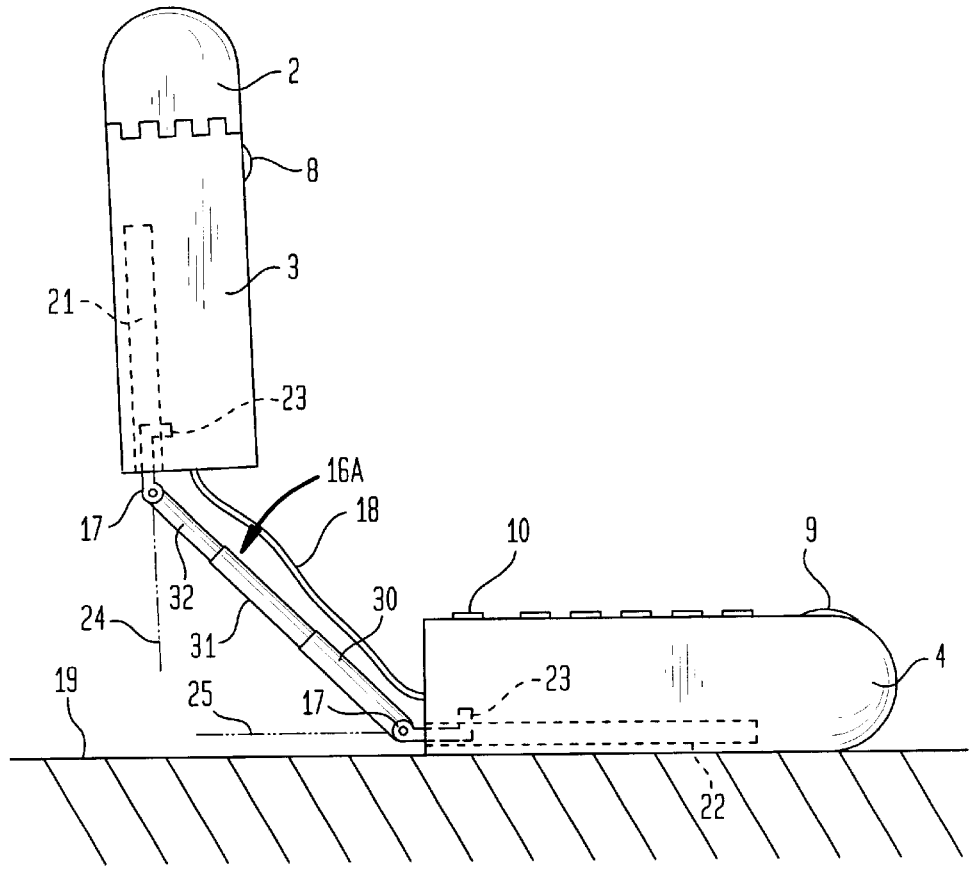
FIG. 7 is a side view illustrating the video display console in the remote position and tilted relative to the base console.

Now, the physical interconnection between the video display console 3 and the base console 4 will be described with reference to FIGS. 5–8. The video display console 3 is connected to the base console 4 and moveable relative thereto. FIGS. 1 and 2 illustrate the video display console 3 in a first position, proximate to and abutting, the base console 4. FIGS. 5–7 illustrate the video display console 3 in a second position, remote from the base console 4.

Figure 8:
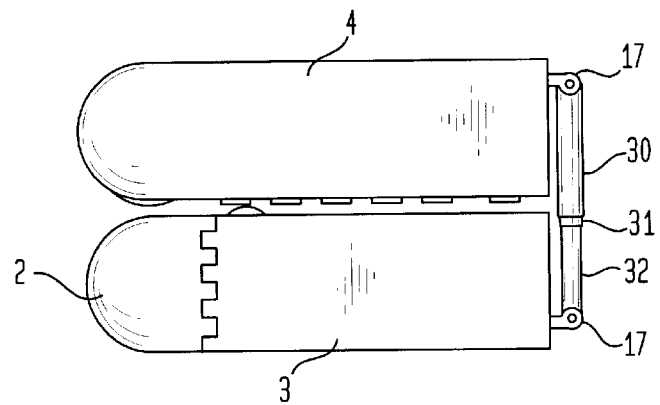
FIG. 8 is a side view illustrating the video display console overlaying the base console.

FIGS. 5, 7, and 8 illustrate the video display console 3 as being connected to the base console 4 by two linkages 16A, 16B. Each linkage is a mirror image of the other, therefore only the physical details of one of the two linkages 16A, 16B will be described.

One end of the linkage 16A is slidingly engaged within a first linkage track 21 formed within the video display console 3. The other end of the linkage 16A is slidingly engaged within a second linkage track 22 formed within the base console 4. Each end would have a protrusion 23, or enlarged portion, so that each end would be captured within its respective linkage track 21, 22. This captured form of sliding engagement would allow the video display console 3 to be moved completely to its second position, but would not allow the video display console 3 to be removed from the base console 4.

It should be noted that one or the other of the connections between the linkage 16A and the video display console 3 and base console 4 could be a fixed connection, similar to the connection between the guide rod 11 and the video display console 3, discussed above. In this arrangement, the maximum possible length of the linkage 16A would be shorter. Therefore, the second position of the video display console 3 would be closer to the base console 4. Also, it would be possible to modify the form of the linkage tracks 21, 22 so that the linkage 16A could be removed from the linkage tracks 21, 22 of either or both of the video display console 2 and the base console 4 under predetermined circumstances, such as to perform service work. Further, it would be possible to have only a single linkage connecting the video display console 3 and the base console 4, such as a flat plate-like linkage. Further, it would be possible to have three or more linkages connecting the video display console 3 and the base console 4.

In a preferred embodiment, the linkages 16A, 16B are telescoping. As illustrated in FIG. 5, each linkage would include a plurality of progressively smaller sliding links 30, 31, 32 adapted to fit into one another. In this preferred embodiment, the distance between the display console 3 and the base console 4 could be greatly increased when the display console is in its second position.

The video display console 3 is held in the first position by a frictional force occurring between the sliding links 30, 31, 32 of the linkage 16A, and occurring between the linkage 16A and the respective linkage tracks 21, 22. To move the video display console 3 to the second position, a user of the communication terminal 1 applies a manual force to the joint between the video display console 3 and the base console 4 by pulling the two consoles 3, 4 away from each other. The manual force will continually overcome the frictional force occurring between the linkage 16A and the respective linkage tracks 21, 22 and between the sliding links 30, 31, 32, as the video console 3 is moved to the second position. To place the video display console 3 back in the first position, the user simply pushes the two consoles 3, 4 toward each other. If a more secure holding of the video display console 3 in the first position is desired, protrusions and recesses, as described above, can be provided at the juncture of the two consoles 3, 4.

FIG. 6 illustrates an alternative form of linkage between the video display console 3 and the base console 4. Here, the linkage is in the form of a scissors linkage 33. Each connection between the scissors linkage 33 and one of the video display console 3 and base console 4 would include a hinge 17 mounted to a slide block 80. Each slide block 80 is free to reciprocate with a slide block channel 81, as indicated by the arrows. The scissors linkage 33 would be completely incorporated into and between the video display console 4 and the base console 4 when the video display console 3 is in the first position. Further, the scissors linkage 33 would allow the video console 3 to be displaced a great distance from the base console 4 when in the video display console 3 is in the second position.

As illustrated in FIG. 7, once the video display console 3 is in the second position, both the video display console 3 and the base console 4 can be manually tilted relative to the linkages 16A, 16B or the scissors linkage 33. In order to accomplish this function, two hinges 17 are provided close to the distal ends of the linkages 16A, 16B, 33. The user may selectively set the angles between the linkage and either or both of the video display console 3 and the base console 4. One of the selected angles could be plus or minus ninety degrees relative to a line 24, which is collinear with a direction of extent of the linkage guide 21. The other of the angles could be plus or minus ninety degrees relative to a line 25, which is collinear with a direction of extent of the linkage guide 22.

One particular advantage of the relative tilt between the video display console 3 and the base console 4 is that the user can set the base console 4 of the communication terminal 1 on a surface 19, such a desk, a chair or the ground. If the base console 4 is of sufficient weight, e.g. contains a battery, the communication terminal 1 will balance in this configuration, as illustrated in FIG. 7. This configuration provides a convenient, hands-free manner for the user to view the video display 7 and remain a suitable distance from the camera lens 6, while still being close enough to utilize the microphone 8 and hear the speaker 9.

Another advantage of the relative tilting is that the video display console 3 can be made to overlay the base console 4, as illustrated in FIG. 8. In this configuration, the video display 7 and camera lens 6 face the base console 4 and are protected. Further, the communication terminal 1 is made more compact for carrying or storage.

Electrical connections would exist between the video display console 3 and the base console 4. These electrical connections could be provided by a flexible ribbon cable 18 extending between the two consoles 3, 4. Alternatively, one or both of the linkages 16A, 16B could be hollow and the electrical connections could pass through the hollow space (s) within the linkages 16A, 16B. It would also be suitable to provide wireless communications between the three consoles, such as an infrared link, inductive link or radio signals.

In order to provide dust and moisture protection to the exposed area between the video display console 3 and the base console 4, when the video display console 3 is in the second position, a bellows could be provided. The bellows would be constructed of a highly flexible material, such as plastic, rubber, or a synthetic cloth, and would be connected to both the video display console 3 and the base console 4. When the video display console 3 is in the first position, the bellows would collapse upon itself to occupy a small space between the video display console 3 and the base console 4.

FIG. 9 illustrates a first alternative embodiment of the communication terminal 1. In this embodiment, the camera console 2 is located to a side of the video display console 3. The image 42 displayed on the video display 7 would be oriented ninety degrees relative to a longitudinal direction of the communication terminal 1. All other interconnections, and modifications, discussed in relation to FIG. 1–8 would equally apply to the communication terminal 1 of FIG. 9.

As illustrated in FIG. 10, when the user operates the communication terminal 1 of FIG. 9, his head would be partially encircled by the consoles 2, 3, 4. In this orientation, the video display 7 would be place into the line of sight 43 of the user, the speaker 9 would be adjacent to the user's ear 44, and the microphone 8 would be in front of the user's mouth. It should be noted that the spacing between the video display 7 and the user's eyes can be aligned and adjusted via the linkages 16A, 16B and the hinges 17. Therefore, FIG. 9 illustrates the preferred embodiment of the invention, when the communication terminal 1 is to be operated in the orientation illustrated in FIG. 10.

It would also be possible to operate the communication terminal 1, illustrated in FIG. 1–8, in the orientation of FIG. 10. Here, the camera lens 6 would be off-center of the user's face, and a slight profile image would be transmitted. Also, it would be required to process the signals of the camera and video display 7 so as to rotate the images by ninety degrees.

It is envisioned that a manual switch would be provided on one of the consoles 2, 3, 4, so that the user could select whether to operate the communication terminal 1 as illustrated in FIG. 7 or as illustrated in FIG. 10. The manual switch would cause the processing of the image signals to be rotated by ninety degrees. Also, the manual switch could be replaced by an automatic switch, such as a mercury switch, which automatically determines the orientation of the communication terminal 1 during use and processes the image signals accordingly.

Figure 11:
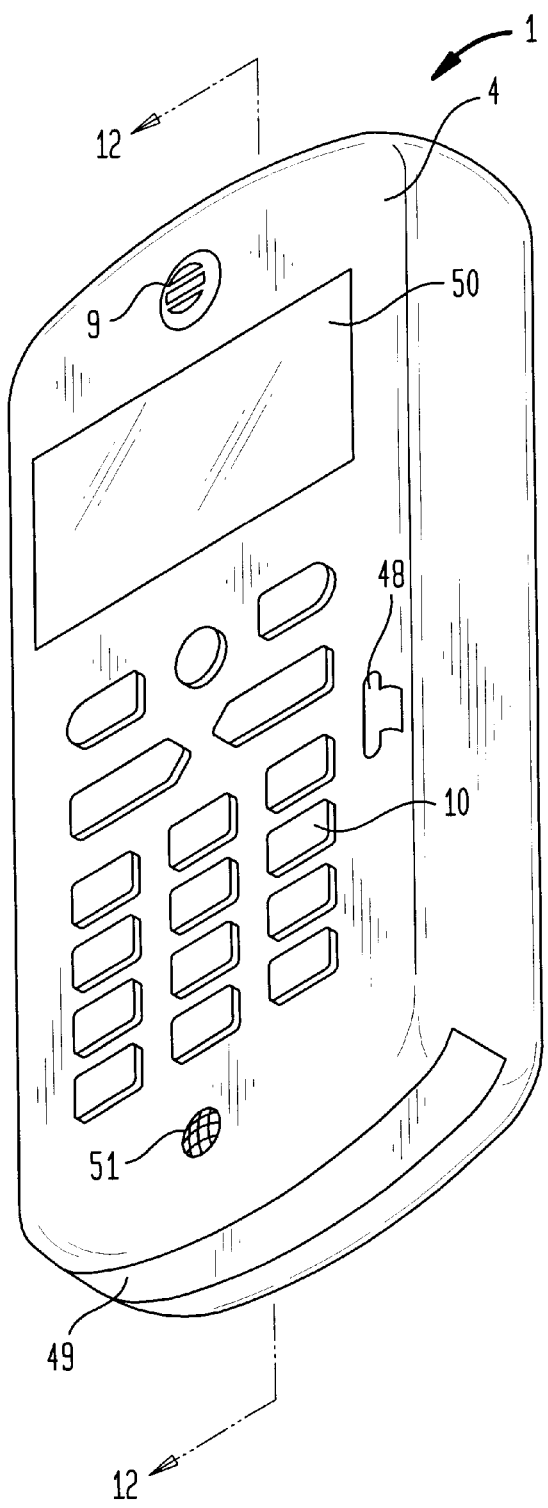
FIG. 11 is a front view of a second alternative embodiment of the communication terminal, wherein the video display console and linkage are consecutively received inside the base console.
Figure 12:
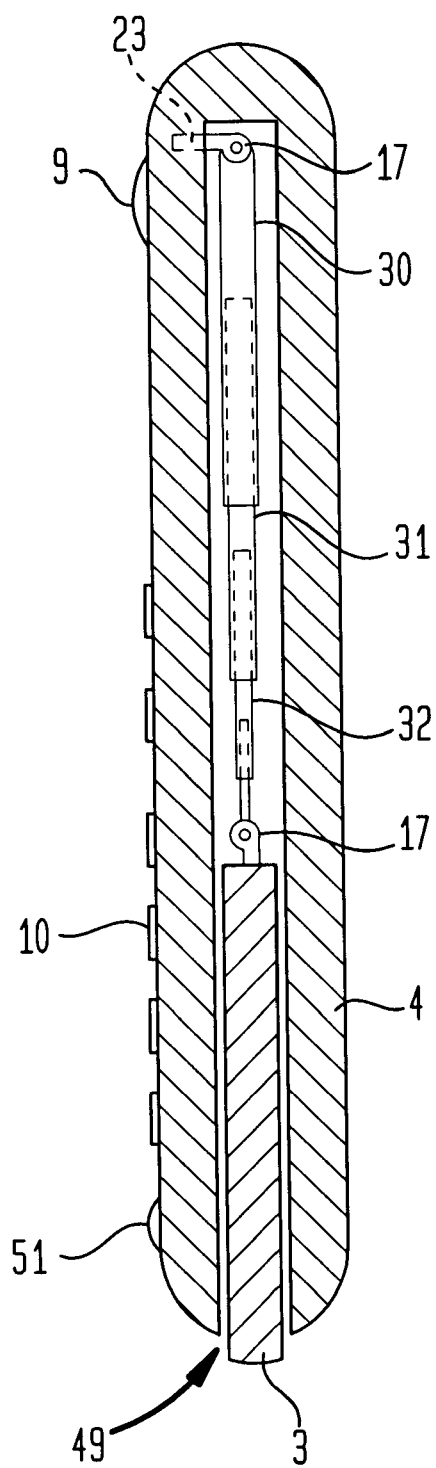
FIG. 12 is a cross-sectional view taken along line 12—12 of FIG. 11.
Figure 13:
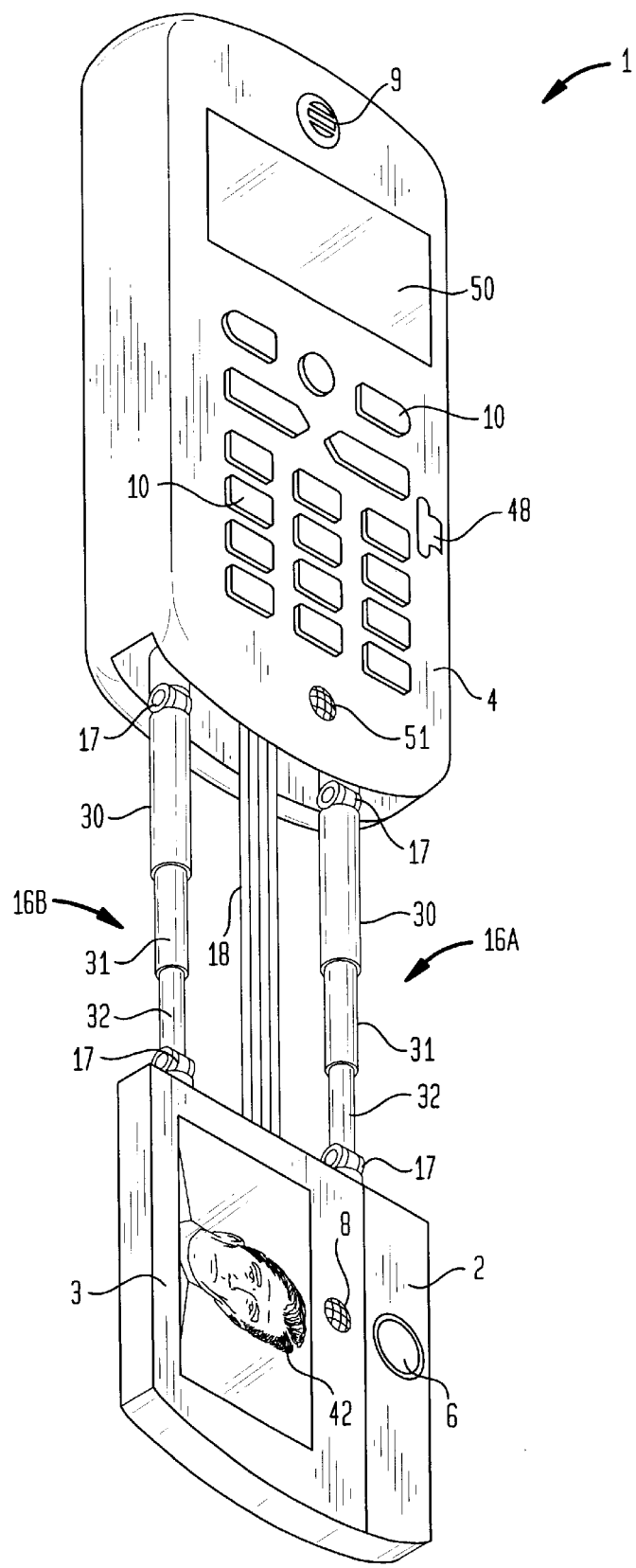
FIG. 13 is a front view of the second alternative embodiment with the video display console located in the remote position.

FIGS. 11–13 illustrate a second alternative embodiment of the communication terminal 1. Here, the video display console 3, in its first position, is not abutting the base console 4. Rather, the video display console 4, and the camera console 2, reside within the base console 4 when the video display console 3 is in its first position.

An opening 49 is provided in a lower, side surface of the base console 4. The opening 49 serves to receive the video display console 3 and camera console 2. A release latch button 48 is provided on the base console 4 to cause the video display console 3 to protrude through the opening 49.

Since the base console 4 is the only console normally exposed, it is possible to reduce the length of the communication terminal 1. Further, the ruggedness of the unit is improved, since the camera lens 6 and video display 7 are protected within the base console 4 when not in use.

A second microphone 51 can be included on the base console 4 so that the communication terminal 1 can be operated like a conventional cell phone, when it is not desired or possible to utilize the video features. Alternatively, it would be possible to provide the microphone 8 near an edge of the video display console 3 so that the microphone 8 resides at or near the opening 49 and can receive voice sounds. Also, the base console 4 could include a small, LCD screen 50 to indicate the number dialed, caller ID, messages waiting, etc. when the base console 4 is being used as a conventional cell phone.

FIG. 12 is a cross-section taken across line 12—12 of FIG. 11. It can be seen that one of a pair of telescoping linkages 30, 31, 32 connects the video display console 3 to the base console 4. As described in relation to FIG. 7, the upper telescoping link 30 would include the protrusion 23 riding in the linkage track. Further, the hinges 17 would be provided at the distal ends of the two linkages 16A, 16B. Of course, other forms of linkages could be used, such a telescoping plate linkage, or a fixed length linkage.

FIG. 13 illustrates the video display console 3 in its second position, remote from the base console 4. In the second position, the camera console 2 can be rotated relative to the display console 3, in a manner consistent with the discussion above relating to FIGS. 3–4. Further, the communication terminal 1 can be used by the operator, as illustrated in FIG. 10.

Figure 14:
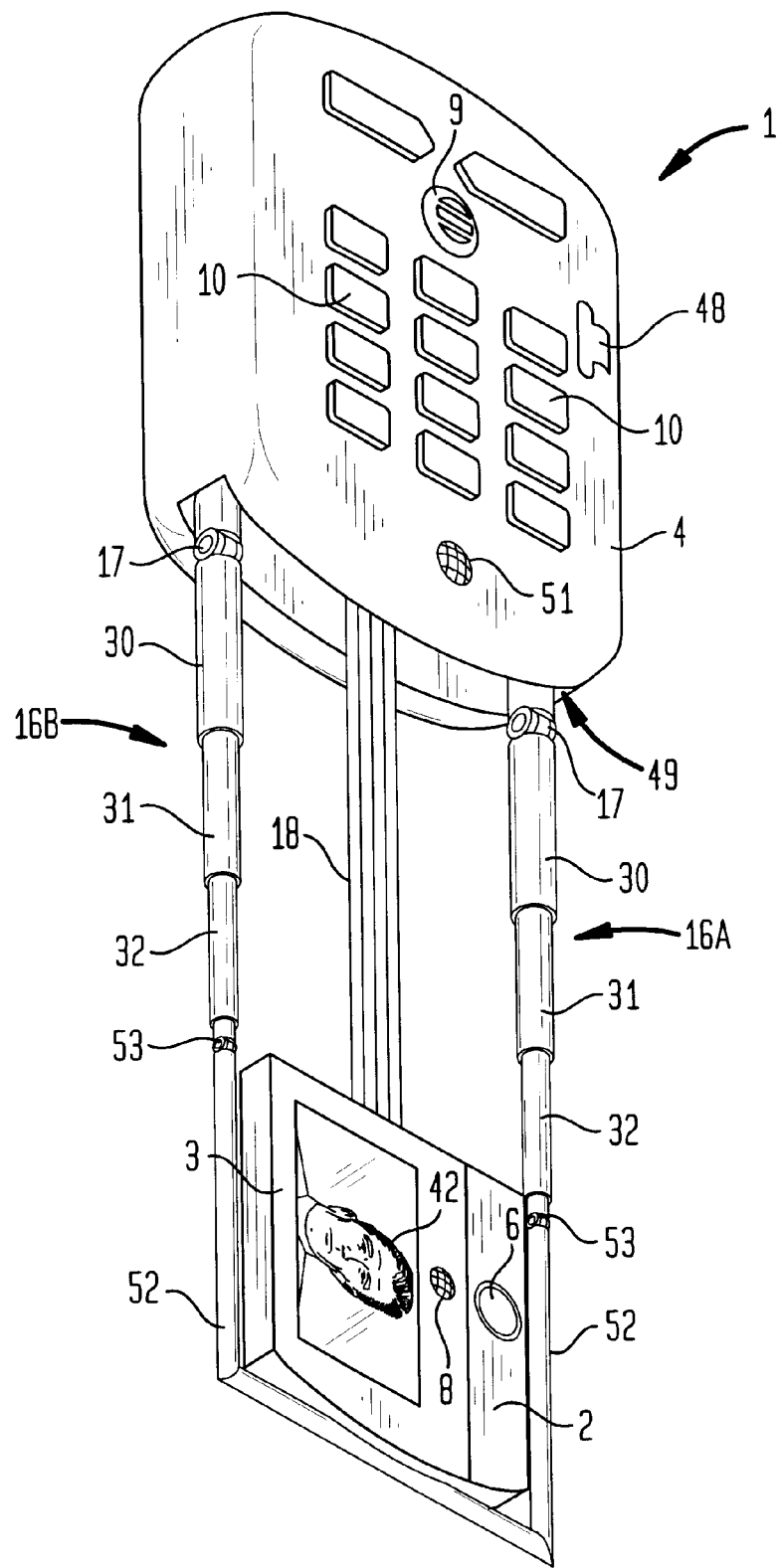
FIG. 14 is a front view of a third alternative embodiment of the communication terminal, wherein the video display console is part of the telescoping linkage.

FIG. 14 illustrates a third alternative embodiment of the communication terminal 1. In the third alternative embodiment, the video display console 3 and camera console 2 are integrated into the telescoping linkages 16A, 16B. The integration occurs by including additional telescoping links 52 adapted to slide into telescoping links 32. The additional telescoping links 52 would include miniature hinges 53 which can slide, along with the telescoping links 52, into the telescoping links 32.

The third alternative embodiment allows the base console to be reduced in the lengthwise dimension. Therefore, the communication terminal 1 can be made more compact and convenient to carry, while still maintaining the functional characteristics of a conventional cell phone when the video display terminal 3 is in the first position.

Figure 15:
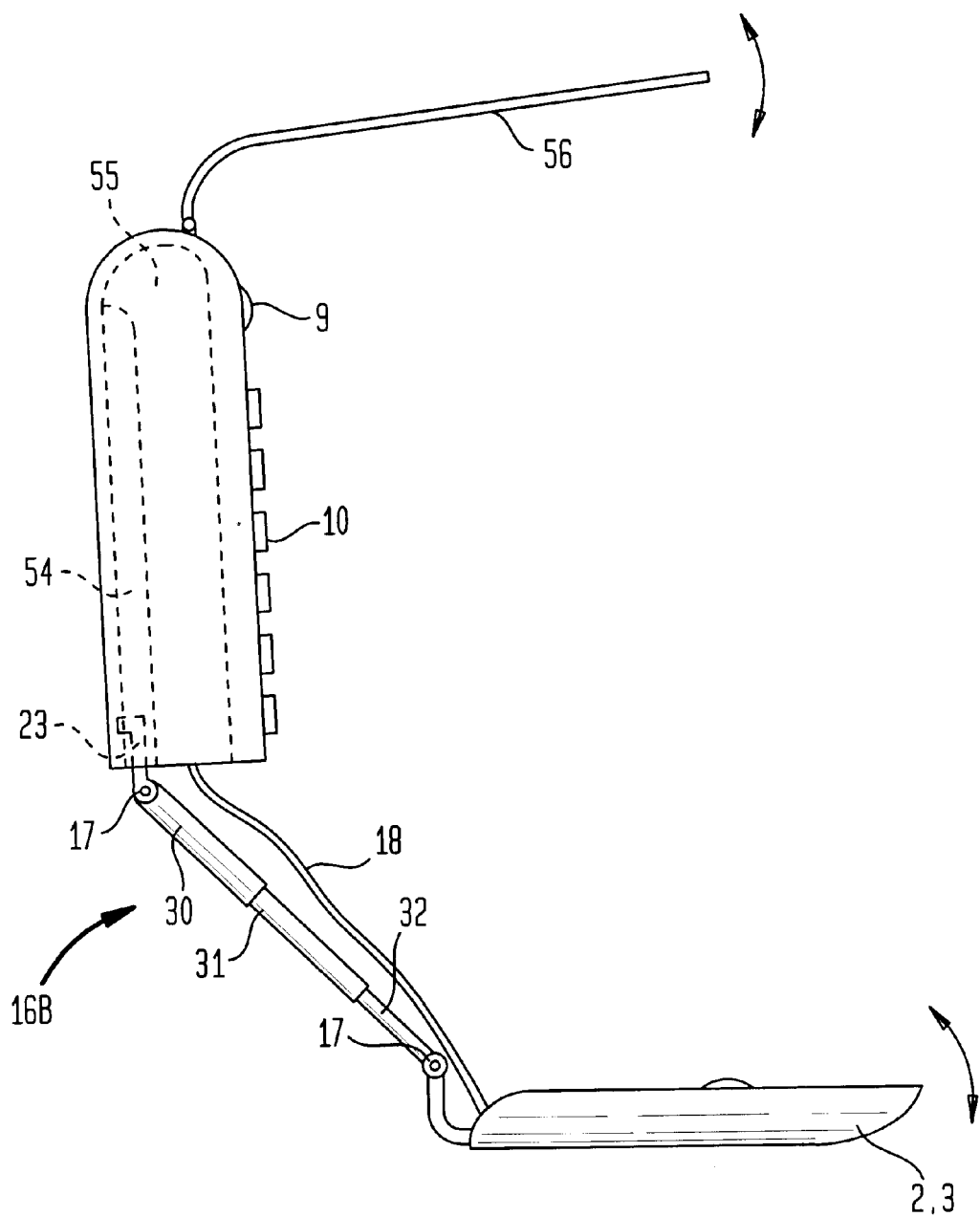
FIG. 15 is a side view of a fourth alternative embodiment of the communication terminal, wherein the video display console can overlay the telescoping linkage.
Figure 16:
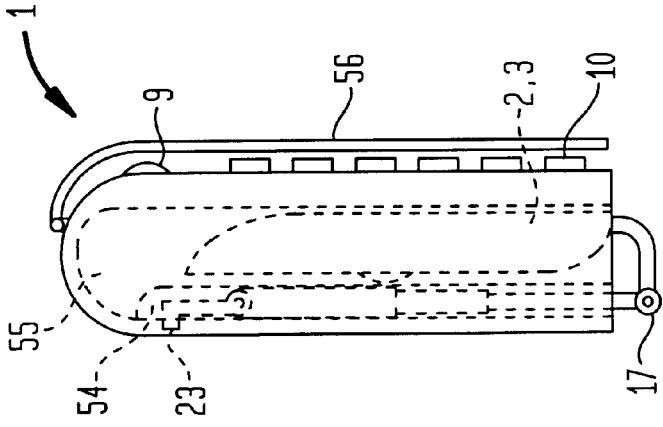
FIG. 16 a side view of the fourth alternative embodiment with the video display console inside the base console.

FIGS. 15–16 illustrate a fourth alternative embodiment of the communication terminal 1. Here, the base console 4 is again very compact. Unlike the third alternative embodiment, the video display console 3 and camera console 2 are not integrated into the telescoping linkages 16A, 16B. Instead, by virtue of the lower hinges 17, the video display console 3 and camera console 2 can be made to overlay the telescoping linkages 16A, 16B.

When placing the video display 3 into the first position, the telescoping linkages 16A, 16B would slide into guide tracks 54, and the video display console 3 and camera console 2 would slide into a protected track 55. Again, projections 23 would be provided on the telescoping links 30, and would be captured and slidable within the guide tracks 54. Also, the protected track 55 could be lined with soft material to insulate and protect the video display console 3 and camera console 2 during storage.

A hinged face cover 56 could be provided to protect the keypad 10 and speaker 9. As illustrated in FIG. 16, once the video display 3 is in the first position, and the hinged face cover 56 is closed, the communication terminal 1 is extremely compact, drop tolerant, and highly protected from dust and moisture of the environment.

Figure 17:
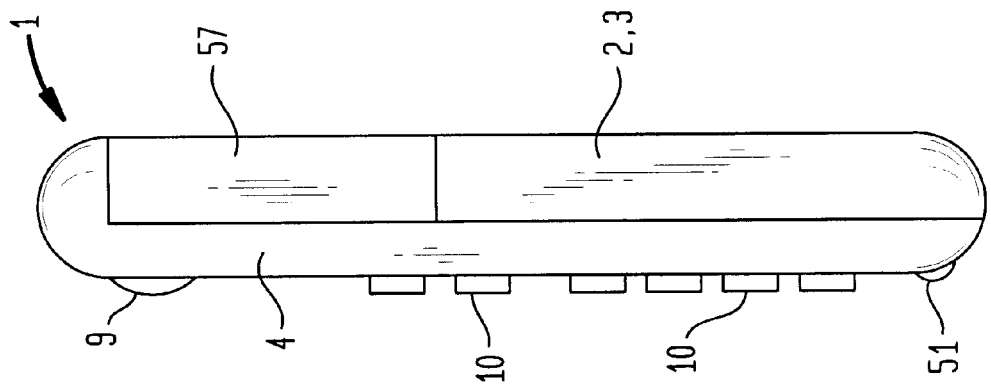
FIG. 17 is a side view of a fifth alternative embodiment of the communication terminal, wherein the video display console and linkage can individually overlay the base console.
Figure 18:
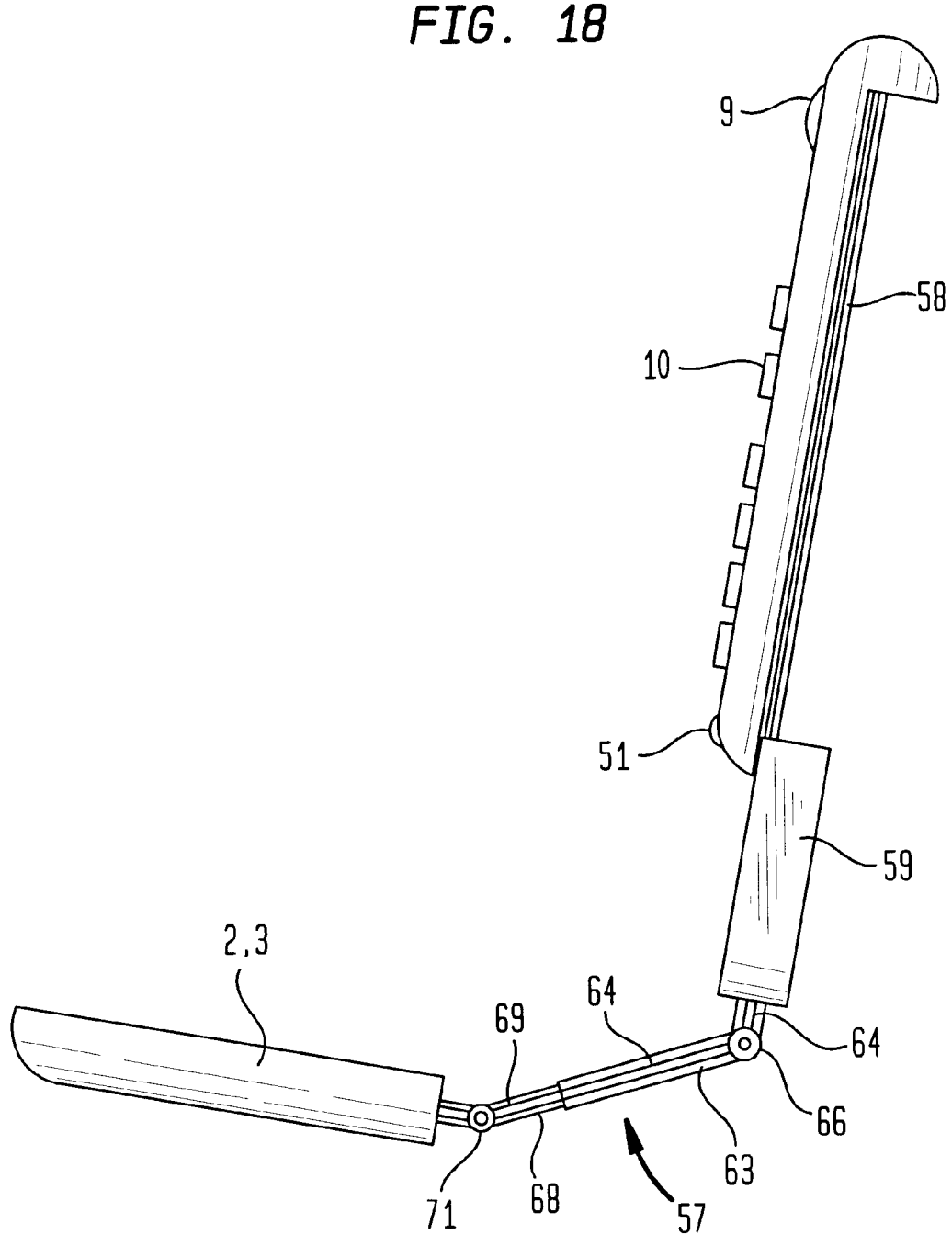
FIG. 18 is a side view of the fifth embodiment with the video display console in the remote position.
Figure 19:
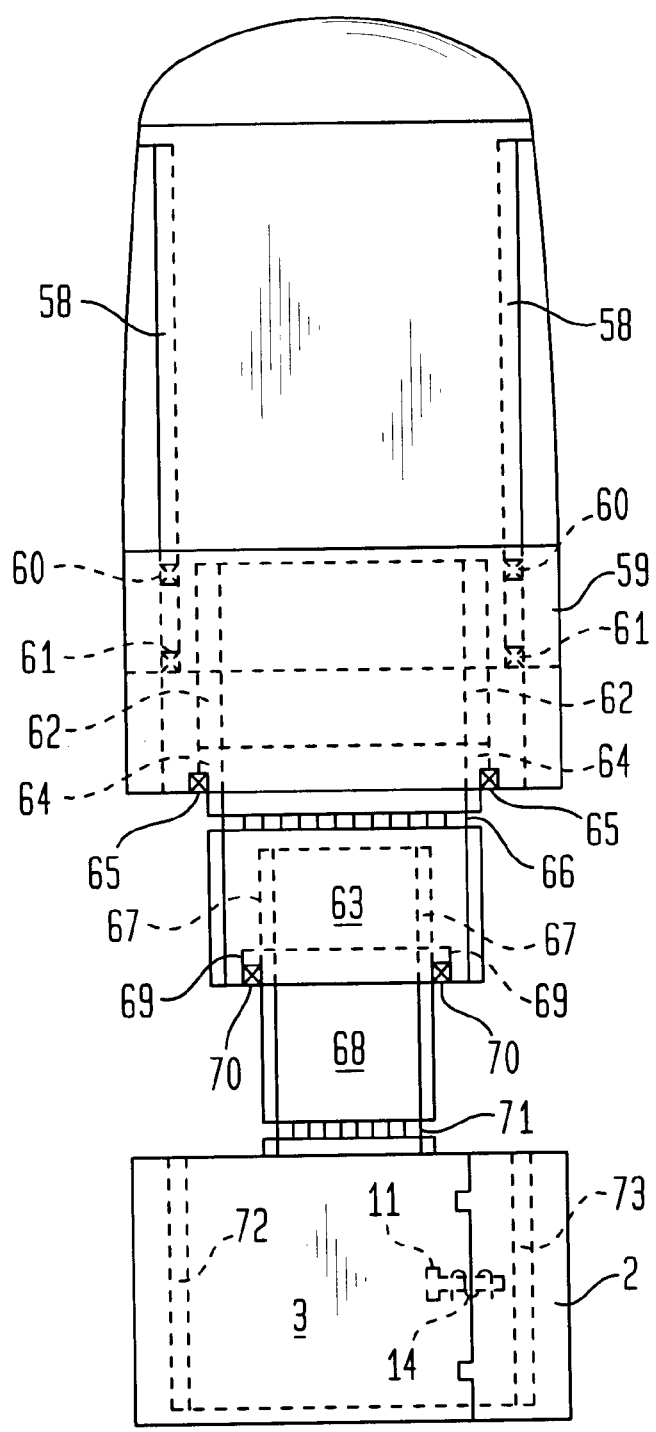
FIG. 19 is a back view of the fifth embodiment with the video display console in the remote position.

FIGS. 17–19 illustrate a fifth alternative embodiment of the communication terminal 1. Here, the face of the base console 4 could resemble the face of base console 4 of the second alternative embodiment, illustrated in FIG. 11. The base console 4 would not have the opening 49 for receiving the video display console 3 in its first position. Instead, the back face of the base console 4 includes alignment features for receiving the video display console 3 and camera console 2 in an overlaying relationship. A plate-like telescoping linkage 57 would also be received into the alignment features of the back face to overlay the base console 4.

FIGS. 18 and 19 are a side view and a back view, respectively, of the fifth alternative embodiment with the video display console 3 in its second position, remote from the base console 4. The alignment features include first recessed guide slots 58 formed in the sides of the back face of the base console 4. The plate-like telescoping linkage 57 includes a first plate 59 having first followers 60 for riding within the first guide slots 58. Ends of the first guide slots 58 include first stops 61 to prevent the first followers 60 from leaving the first guide slots 58. Also, the first plate 59 includes second guide slots 62 formed in side surfaces thereof.

The plate-like telescoping linkage 57 also includes a second plate 63. The second plate 63 includes second followers 64 for riding within the second guide slots 62. Ends of the second guide slots 62 include second stops 65 to prevent the second followers 64 from leaving the second guide slots 62. The second plate 63 includes a first piano hinge 66 and third guide slots 67 formed in side surfaces thereof.

The plate-like telescoping linkage 57 also includes a third plate 68. The third plate 68 includes third followers 69 for riding within the third guide slots 67. Ends of the third guide slots 67 include third stops 70 to prevent the third followers 69 from leaving the third guide slots 67. The third plate 68 includes a second piano hinge 71 and has the video display console 3 attached to the remote end thereof.

The video display console 3 includes a fourth follower 72 adapted to engage within one of the first guide slots 58 formed in the back face of the base console 4. The camera console 2 is attached to the video display console 3 by the guide rod 11 and spring 14 (discussed in relation to FIG. 3, above). The camera console 2 includes a fifth follower 73 adapted to engage within the other of the first guide slots 58 formed in the back face of the base console 4. By the fifth embodiment, the video display console 3 and the camera console 2 will be secured to, and overlay, the base console 4, when the video features of the communication terminal 1 are not being utilized.

Figure 21:
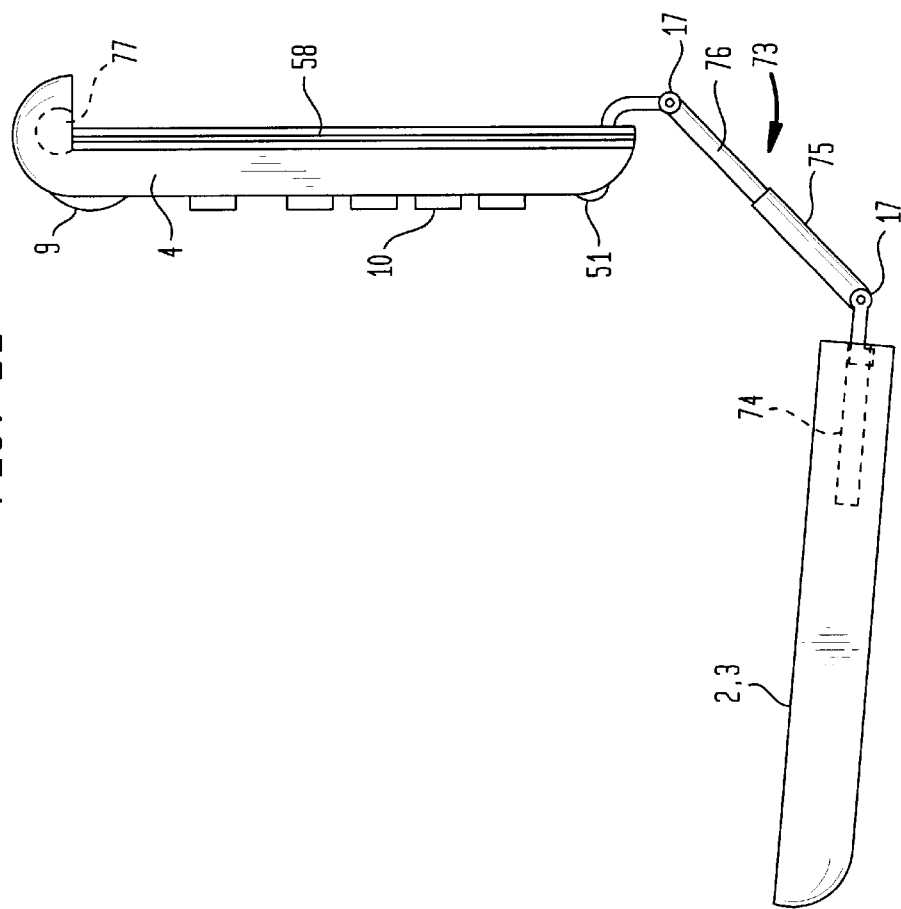
FIG. 21 is a side view of the sixth embodiment with the video display console in the remote position.
Figure 20:
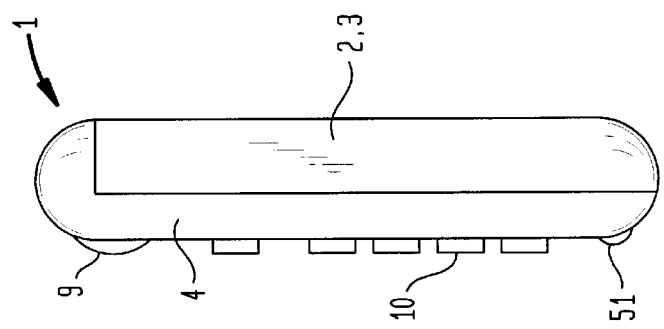
FIG. 20 is a side view of a sixth alternative embodiment of the communication terminal, wherein the video display console can overlay the linkage which can overlay the base console.

FIGS. 20 and 21 illustrate a sixth alternative embodiment of the communication terminal 1. The sixth alternative embodiment combines features of the fifth and third alternative embodiments. The base console 4 includes the first guide slots 58, however the video display console 3 and camera console 2 are integrated into a modified telescoping linkage 73, which includes a first extent 75 and a second extent 76. The video display console 3 includes a guide track 74 for receiving portions of the modified telescoping linkage 73.

When the video display console 3 is in the first position, the second extent 76 of the modified telescoping linkage 73 slides into the first extent 75, and the combination slides into the guide track 74 within the video display console 3. A cavity 77 may also be provided in the base console 4 to accommodate a portion of the modified telescoping linkage 73, when the video display console 3 is in the first position.

Each embodiment described above yields, a portable, wireless communication terminal, which can be physically expanded and reconfigured so that the video and audio features of the communication terminal will be easily accessible to the user. The interconnections between the consoles allow a great deal of flexibility in the operation of the communication terminal. The communication terminal is rugged in design and can withstand rough environments and dropping. After operation, the communication terminal can be retracted into a compact configuration, which is suitable for carrying or storage.

Having described many alternative embodiments of the present invention, it should be noted that variations and substitutions can be made among the many features of the embodiments. For example, the plate-like linkage of FIG. 19 could be substituted for the rod-like linkages of FIG. 5, or the LCD display 50 of FIG. 11 could be included on the small, base consoles of FIGS. 14, 15 and 20. Such variations are not to be regarded as a departure from the spirit and scope of the invention, and all such modifications as would be obvious to one skilled in the art are intended to be included within the scope of the following claims.

What is claimed is:

1. A portable wireless communication terminal comprising:
   a camera console;
   a camera mounted in said camera console;
   a video display console;
   a video display mounted in said video display console; and
   a base console, wherein said camera console, video display console, and base console are interconnected and said camera console is movable relative to said video display console; and
   a guide extendable between said camera console and said video display console, said guide being centered about a first axis and being extendable from a first position to a second position, said camera console being rotatable about said first axis;

wherein a surface of said camera console facing said video display console has projections formed thereon and wherein a surface of said video display console facing said camera console has recesses adapted to matingly engage with said projections when said camera console is in said first position to prevent said camera console from rotating about said first axis when in the first position.

2. The portable wireless communication terminal according to claim 1, further comprising:
a microphone mounted in said video display console; and
a speaker and a keypad mounted in said base console.

3. The portable wireless communication terminal according to claim 1, wherein said camera console is selectively rotatable about said first axis by manual manipulation.

4. The portable wireless communication terminal according to claim 1, wherein the guide guides said camera console between the first position, adjacent to said video display console, and the second position, remote from said video display console.

5. The portable wireless communication terminal according to claim 4, wherein said camera console is selectively movable between said first position and said second position by manual manipulation.

6. The portable wireless communication terminal according to claim 4, wherein said guide is a threaded member fixedly mounted to one of said camera console and said video display console and threadedly engaged for rotation within the other of said camera console and said video display console.

7. The portable wireless communication terminal according to claim 4, wherein said guide is fixedly mounted to one of said camera console and said video display console and is slidably engaged within the other of said camera console and said video display console.

8. The portable wireless communication terminal according to claim 4, wherein said guide is centered about a first axis and wherein said camera console is rotatable about said first axis when said camera console is in said second position.

9. The portable wireless communication terminal according to claim 8, further comprising:
a spring interconnecting said camera console and said video display console and biasing said camera console toward said first position.

10. A portable wireless communication terminal comprising:
a camera console;
a camera mounted in said camera console;
a video display console;
a video display mounted in said video display console; and
a base console, said camera console, video display console, and base console are interconnected and said video display console being movable relative to said base console; and
at least one linkage connecting said video display console and said base console, said at least one linkage guiding said video display console between a first position, proximate to said base console, and a second position, remote from said base console; said at least one linkage being a telescoping linkage including a plurality of links slidingly engaged with one another.

11. The portable wireless communication terminal according to claim 10, further comprising:
a microphone mounted in said video display console; and
a speaker and a keypad mounted in said base console.

12. The portable wireless communication terminal according to claim 10, wherein said video display console is selectively movable between said first position and said second position by manual manipulation.

13. The portable wireless communication terminal according to claim 10, wherein said plurality of links include tubes of progressively smaller diameters slidingly engaged within one another.

14. The portable wireless communication terminal according to claim 10, wherein said plurality of links include plate-like members slidingly engaged with one another.

15. The portable wireless communication terminal according to claim 10, wherein said at least one linkage has a first distal end connected to said base console and a second distal end connected to said video display console, and further comprising:
a hinge provided at said second distal end so that said video display console is pivotal relative to said at least one linkage.

16. The portable wireless communication terminal according to claim 10, wherein said at least one linkage has a first distal end connected to said base console and a second distal end connected to said video display console, and further comprising:
a first hinge provided at said first distal end so that said base console is pivotal relative to said at least one linkage.

17. The portable wireless communication terminal according to claim 16, further comprising:
a second hinge provided at said second distal end so that said video display console is pivotal relative to said at least one linkage.

18. The portable wireless communication terminal according to claim 10, wherein said first position corresponds to said video display console adjoining said base console.

19. The portable wireless communication terminal according to claim 18, wherein said at least one linkage has a first distal end connected to said base console and a second distal end connected to said video display console, and further comprising:
a first hinge provided at said first distal end so that said base console is pivotal relative to said at least one linkage; and
a second hinge provided at said second distal end so that said video display console is pivotal relative to said at least one linkage.

20. The portable wireless communication terminal according to claim 19, wherein said video display console can be pivoted relative to said base console so that said video display overlays and is protected by said base console.

21. The portable wireless communication terminal according to claim 19, wherein the connection between said first distal end of said at least one linkage and said base console is a captured, sliding engagement.

22. The portable wireless communication terminal according to claim 21, wherein the connection between said second distal end of said at least one linkage and said video display console is a captured, sliding engagement.

23. The portable wireless communication terminal according to claim 10, wherein said first position corresponds to said video display console residing within said base console.

24. The portable wireless communication terminal according to claim 23, wherein said video display console overlays said at least one linkage, when said video display console is in said first position.

25. The portable wireless communication terminal according to claim 23, wherein said at least one linkage has a first distal end connected to said base console and a second distal end connected to said video display console, and further comprising:
- a hinge provided at said second distal end so that said video display console is pivotal relative to said at least one linkage.

26. The portable wireless communication terminal according to claim 25, wherein said hinge allows said video display console to overlay said at least one linkage before said display console is placed in said first position within said base console.

27. The portable wireless communication terminal according to claim 10, wherein said first position corresponds to said video display overlaying said base console.

28. The portable wireless communication terminal according to claim 27, wherein said video display console overlays said at least one linkage, when said video display console is in said first position.

29. The portable wireless- communication terminal according to claim 27, wherein said video display console and said base console include alignment features for holding said video display console and said base console together, when said video display console is in said first position.

30. A portable wireless communication terminal comprising:
- a camera console;
- a camera mounted in said camera console;
- a video display console;
- a video display mounted in said video display console; and
- a base console, the base console, camera console and video display console being interconnected and said video display console being movable relative to said base console; and
- at least one linkage connecting said video display console and said base console, said at least one linkage guiding said video display console between a first position, proximate to said base console, and a second position, remote from said base console, wherein said at least one linkage has a first distal end connected to said base console and a second distal end connected to said video display console; and
- a pivotal member provided at said second distal end so that said video display console is pivotal relative to said at least one linkage;
- wherein a surface of said camera console facing said video display console has projections formed thereon and wherein a surface of said video display console facing said camera console has recesses adapted to matingly engage with said projections when said camera console is in said first position to prevent said camera console from rotating about said first axis when in the first position.

31. A portable wireless communication terminal comprising:
- a camera console;
- a camera mounted in said camera console;
- a video display console;
- a video display mounted in said video display console; and
- a base console, camera console, and video display console being interconnected and said video display console being movable relative to said base console; and
- at least one linkage connecting said video display console and said base console, said at least one linkage guiding said video display console between a first position, proximate to said base console, and a second position, remote from said base console, wherein said at least one linkage has a first distal end connected to said base console and a second distal end connected to said video display console; and
- a first pivotal member provided at said first distal end so that said base console is pivotal relative to said at least one linkage;
- wherein a surface of said camera console facing said video display console has projections formed thereon and wherein a surface of said video display console facing said camera console has recesses adapted to matingly engage with said projections when said camera console is in said first position to prevent said camera console from rotating about said first axis when in the first position.

* * * * *

UNITED STATES PATENT AND TRADEMARK OFFICE
CERTIFICATE OF CORRECTION

| | | |
|---|---|---|
| PATENT NO. | : 6,751,473 B1 | Page 1 of 1 |
| APPLICATION NO. | : 09/258824 | |
| DATED | : June 15, 2004 | |
| INVENTOR(S) | : Suresh Goyal et al. | |

It is certified that error appears in the above-identified patent and that said Letters Patent is hereby corrected as shown below:

On the Title Page, Related U.S. Application Data should read

(63)  Continuation-in-part of application no. 09/052,820, filed on March 31, 1998, now Patent No. 6,192,257.

Signed and Sealed this

Thirty-first Day of December, 2013

Margaret A. Focarino
*Commissioner for Patents of the United States Patent and Trademark Office*